United States Patent [19]
Kobayashi et al.

[11] Patent Number: 4,727,850
[45] Date of Patent: Mar. 1, 1988

[54] SECONDARY AIR CONTROL DEVICE FOR INTERNAL COMBUSTION ENGINES

[75] Inventors: Hideo Kobayashi; Haruo Shimamura; Hiroshi Hasebe, all of Saitama, Japan

[73] Assignee: Honda Giken Kogyo Kabushiki Kaisha, Tokyo, Japan

[21] Appl. No.: 783,475

[22] Filed: Oct. 3, 1985

[30] Foreign Application Priority Data

Oct. 3, 1984 [JP] Japan ................................ 59-207551

[51] Int. Cl.⁴ ........................................... F02M 23/10
[52] U.S. Cl. .................................................. 123/588
[58] Field of Search ................................. 123/585–589

[56] References Cited
FOREIGN PATENT DOCUMENTS 113726 9/1979 Japan ..................................... 123/585
148933 11/1980 Japan ..................................... 123/585

Primary Examiner—William A. Cuchinski, Jr.
Attorney, Agent, or Firm—Lyon & Lyon

[57] ABSTRACT

A secondary air control device for an internal combustion engine wherein the secondary air is introduced into the engine intake downstream of the carburetor in response to sudden increases in vacuum, such as upon rapid deceleration of the vehicle and in turn the engine. The device includes detectors and a circuit for controlling the operation of the secondary air control valve which prevent opening of the valve if both the engine temperature is too low and the vehicle transmission is in neutral.

6 Claims, 3 Drawing Figures

U.S. Patent
Mar. 1, 1988
4,727,850
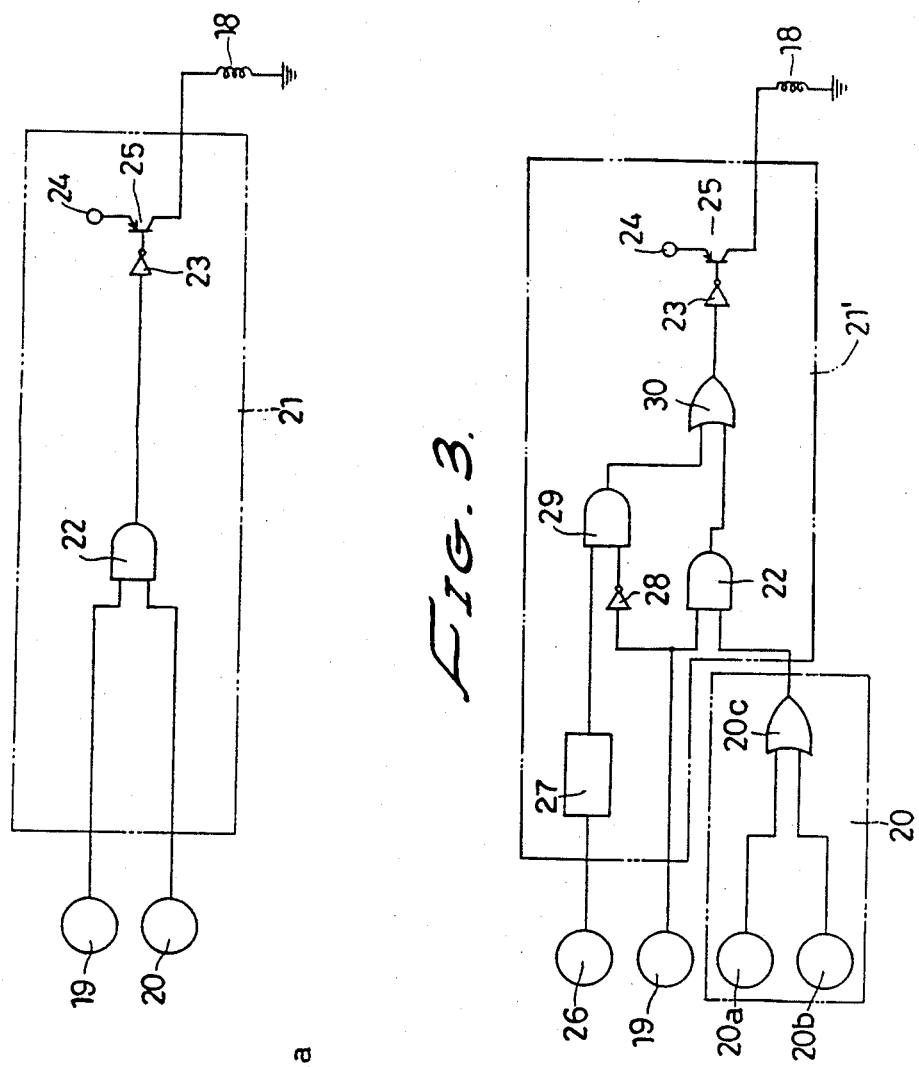
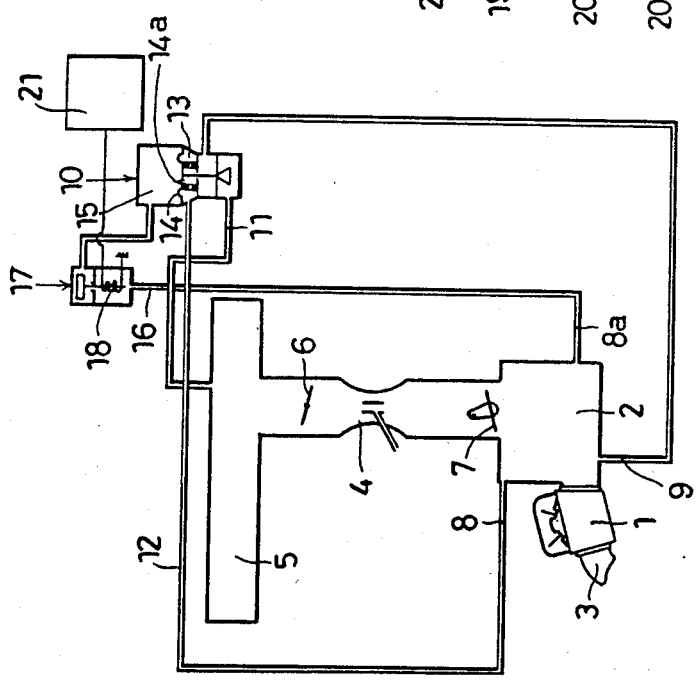

SECONDARY AIR CONTROL DEVICE FOR INTERNAL COMBUSTION ENGINES

The present invention relates generally to a control device for controlling the introduction of secondary or so-called "shot" air in an internal combustion automotive engine.

There are numerous conventional secondary air control devices employed in engines including those having an air valve which is temporarily openable in response to an increase in the negative pressure or vacuum of the intake air for introducing a "shot" of secondary air into the intake passage of the engine. For example, in U.S. Pat. No. 4,195,602 a system is disclosed wherein a secondary air control device is combined with a detector for detecting a low temperature of the engine to make the secondary air valve inoperative in response thereto, thereby improving the starting characteristics of the engine when it is cold. With that proposed arrangement, however, when the engine is operated at the low temperature and the automobile is started and then decelerated quickly, the air-fuel mixture supplied to the engine is too rich and the engine tends to stall. Although it is preferable at such a time to deliver secondary air into the engine for preventing the same from stalling, no air can be introduced since the secondary air valve is closed and rendered inoperative.

It is an object of the present invention to provide a secondary air control device capable of preventing stalling of the engine when it is quickly decelerated shortly after it has been started at a low temperature.

According to the present invention, a secondary air control device combined with an engine includes a secondary air valve temporarily openable for introducing a shot of secondary air into an intake passage of the engine in response to an increase in the vacuum of the intake air, and the secondary air control device includes a low-temperature detector for detecting a low-temperature condition of the engine and a neutral-gear detector for detecting the neutral position of a gear transmission coupled to the engine, whereby the secondary air valve is rendered inoperable in response to actuation of both of the detectors.

The preferred embodiments of the present invention will be described with reference to the accompanying drawings, wherein:

FIG. 1 is a diagrammatic illustration of the secondary air control system of this invention in association with the relevant internal combustion engine components.

FIG. 2 is a block diagram of one form of a control circuit for the secondary air control system of this invention.

FIG. 3 is a block diagram of another form of the control circuit for the secondary air control system of this invention.

As shown in FIG. 1, an engine 1 has an intake manifold 2 serving as an intake passage, an exhaust passage 3, a carburetor 4 disposed upstream of and coupled to the intake passage 2, and an air cleaner 5 disposed upstream of and coupled to the carburetor 4. The carburetor 4 has an upper choke valve 6 and a throttle valve 7 positioned downstream of the choke valve 6 in a conventional manner. The intake passage 2 has a vacuum inlet port 8 for picking up the negative pressure or vacuum of the intake air from the intake passage 2, and a secondary air outlet or injection port 9 for supplying secondary air to the intake passage 2 from a secondary air valve, generally designated 10.

The secondary air valve 10 is disposed in an air passage 11 through which the air injection port 9 is connected to atmosphere via the air cleaner 5. The air valve 10 is normally closed and has a vacuum chamber 13 communicating with the vacuum inlet port 8 through a vacuum passage 12. When the vacuum in the vacuum chamber 13 is increased, the secondary air valve 10 is temporarily opened to supply secondary air to the portion of the air passage 11 which lies downstream of the air valve 10 leading to port 9. The air valve 10 also has a pressure chamber 15 positioned above and divided from the vacuum chamber 13 by a diaphragm 14 having orifices or leak holes 14a for controlling the period of time during which the secondary air valve 10 remains open. The pressure chamber 15 communicates through a vacuum passage 16 with intake manifold 2 at a vacuum inlet port 8a, which is substantially identical to the vacuum inlet port 8. The vacuum passage 16 may communicate with the vacuum inlet port 8. The vacuum passage 16 has a control valve 17 for opening and closing the vacuum passage 16. Normally, the control valve 17 is closed to keep the pressure chamber 15 under a prescribed pressure. When the vacuum in the vacuum chamber 13 is increased, a differential pressure is developed between the chambers 15 and 13 to thereby open the secondary air valve 10. With the control valve 17 open, however, the vacuum from the intake passage 2 is supplied to both of the chambers 15 and 13, resulting in no pressure difference developed therebetween whereby air valve 10 remains closed. In other words, while control valve 17 remains open, the secondary air valve 10 remains in its inoperative or normally-closed position even when the vacuum in the intake passage 2 is increased. The control valve 17 comprises a solenoid-operated valve which is actuated by a solenoid 18. When the solenoid 18 is energized, the control valve 17 is opened to keep the air valve 10 closed.

The aforesaid arrangement is substantially the same as that of any conventional secondary air control device. According to the present invention, as shown in FIGS. 2 and 3, the secondary air control device includes a low-temperature detector 19 for detecting a low temperature of the engine 1, and a neutral-gear detector 20 for detecting the neutral position of a gear transmission coupled to the output shaft of the engine 1. The air valve 10 is rendered inoperative when both of the detectors 19, 20 are actuated, namely, when the engine is cold and the transmission is in neutral.

More specifically, as shown in FIG. 2, the solenoid 18 of the control valve 10 is connected to a control circuit 21. The control circuit 21 includes an AND gate 22 having inputs connected to the outputs of the detectors 19, 20 and an output coupled to an inverter 23. The inverter 23 applies its output signal to a switching device 25 connected between the solenoid 18 and a power supply 24.

When the low-temperature detector 19 issues a high-level signal upon detection of the low temperature (for example, 60° C. or below) of the engine, and also the neutral-gear detector 20 issues a high-level signal in response to detection of the neutral position of the shift lever of the gear transmission, the AND gate 22 produces a high-level signal on its output, and the inverter 23 produces a low-level signal on its output. As a result, the switching device 25 is rendered conductive to energize the solenoid 18 to thereby open valve 17 and cause the closing of the air valve 10. The air valve 10 will not introduce air into the intake passage 2 even though the vacuum in the intake passage 2 is increased. When at least one of the detectors 19, 20 becomes inoperative, however, the switching device 25 is rendered nonconductive to thereby de-energize the solenoid 18, whereupon the secondary air valve 10 can be actuated to an open position upon an increase in the vacuum which is communicated through line 12 to chamber 13.

By way of an operating example, when the engine 1 is to be started at a low temperature, the gear transmission is normally in the neutral position. Consequently, both of the detectors 19, 20 are actuated to keep the secondary air valve 10 inoperative or closed to prevent secondary air from being introduced into the intake passage 2. The starting characteristics of the engine 1 are therefore improved. If the automobile is started with the engine 1 still at the low temperature and the gear transmission out of the neutral position, the valve 17 is closed to allow the air valve 10 to be operable and opened. Accordingly, should the automobile be decelerated quickly, secondary air can be supplied from the air valve 10 into the intake passage 2 to thereby prevent the engine 1 from stalling.

Where the gear transmission is an automatic gear transmission, the "neutral-gear" condition can be detected in both neutral and parking gear positions of the shift lever of the gear transmission. For such an alternative, the neutral-gear detector 20 and the control circuit 21' may be arranged as shown in FIG. 3. In FIG. 3, the neutral-gear detector 20 is composed of a neutral position detector 20a and a parking position detector 20b, which have outputs coupled to an OR gate 20c connected to the AND gate 22 in the control circuit 21'. Thus, "neutral-gear" or "neutral" as used herein shall mean and include both the neutral and park positions of a transmission.

To improve engine starting characteristics by preventing secondary air from being supplied when the engine 1 is to be started at a relatively high temperature (for example, 60° C. or higher), a cranking detector 26 for detecting the cranking of the engine 2 is connected at its output to a timer 27. The low-temperature detector 19 has its output coupled to an inverter 28 and the AND gate 22. The outputs of the timer 27 and the inverter 28 are connected to an AND gate 29. The AND gates 22, 29 have their outputs coupled to an OR gate 30, the output of which is connected through the inverter 23 to the switching device 25. During the cranking of the engine 1 at a high engine temperature and also during a fixed interval of time (for example, 4 seconds) after the cranking of the engine 1 is over, the switching device 25 is rendered conductive to keep the secondary air valve 10 closed and inoperative by opening the valve 17, whereby the engine 1 is not supplied with secondary air.

Operation of the secondary air control device as shown in FIGS. 1 and 2 will now be described. When the low engine temperature is detected by the low-temperature detector 19 and the neutral position of the gear transmission is detected by the neutral-gear detector 20, the solenoid 18 is energized to open the control valve 17. The secondary air valve 10 is brought to the closed and inoperative position to prevent secondary air from being supplied to the intake passage 2. The engine starting characteristics therefore are improved. When the gear transmission is shifted from the neutral position to another gear position to start the automobile moving while the engine 1 is still at the low temperature, the solenoid 18 is deenergized to make the air valve 10 operable. Upon subsequent quick deceleration of the automobile, the air valve 10 is actuated to introduce secondary air into the intake passage 1, thus preventing the engine 1 from stalling due to excessive enrichment of the air-fuel mixture.

According to the present invention, as described above, the secondary air control device includes a low-temperature detector for detecting a low temperature of the engine and the neutral-gear detector for detecting the neutral position of the gear transmission coupled to the engine. The secondary air valve is rendered inoperative when both of the detectors are actuated. As a consequence, when the engine is started at a low temperature, secondary air is prevented from being introduced into the intake passage to thereby improve the engine starting characteristics. When automobile movement is started with the engine remaining at the low temperature and then followed by quick deceleration, the engine is supplied with secondary air to guard against stalling which would otherwise be caused by excessive enrichment of the air-fuel mixture. The secondary air control device of the present invention is simple in construction and inexpensive to manufacture.

The invention claimed is:

1. A secondary air control system for an air intake passage of an internal combustion engine connected to a transmission of a vehicle comprising, a secondary air passage connected to the air intake passage, a secondary air control valve connected to said secondary air passage for controlling air flow therethrough, means for detecting two conditions, namely, a low engine temperature and a neutral position of the transmission, and for causing closing of said secondary air control valve upon the occurrence of both said conditions but allowing opening of said secondary air control valve upon the lack of either of said conditions detected, said detecting and closing means including a solenoid operated valve disposed within a vacuum air passage connected to said secondary air control valve for causing said closing and allowing said opening of said secondary air control valve.

2. The secondary air control system of claim 1 where a circuit means is provided for actuating said solenoid-operated valve, and said circuit means includes a timer means for delaying the actuation of said solenoid-operated valve in response to the occurrence of both a cranking of the engine and a lack of low engine temperature as detected by said detecting and closing means.

3. A secondary air control system for an air intake passage of an internal engine connected to a transmission of a vehicle comprising, a secondary air passage connected to the air intake passage, a secondary air control valve connected to said secondary air passage for controlling air flow therethrough, means for detecting two conditions, namely, a low engine temperature and a neutral position of the transmission and causing closing of said secondary air control valve upon the occurrence of both said conditions but allowing opening of said secondary air control valve upon the lack of either of said conditions being detected, said secondary air control valve having a first chamber and a second chamber on either side of a diaphragm with the diaphragm having means for opening and closing said secondary air control valve.

4. The secondary air control system of claim 3 wherein a separate vacuum passage is connected to each said chamber, and valve means for controlling the vacuum passage connected to one of said chambers for controlling the operation of said secondary air control valve is provided.

5. The secondary air control system of claim 5 wherein said valve means is solenoid-operated, and a circuit means actuates said solenoid-operated valve means in response to the two detected conditions.

6. A secondary air control system for an air intake passage of an internal combustion engine connected to a transmission of a vehicle comprising, a secondary air passage connected to the air intake passage, a secondary air control valve connected to said secondary air passage for controlling air flow therethrough, a solenoid operated valve disposed within a vacuum air passage connected to said secondary air control valve and a detecting and control means, electrically connected to said solenoid operated valve, including a low temperature detector and a neutral gear detector electrically connected to an AND gate which is connected in series to a switching means for alternately connecting and disconnecting a power supply to said solenoid operated valve, said detecting and control means being for causing closing of said secondary air control valve upon opening of said solenoid operated valve when the detecting and control means detects both a low engine temperature and a neutral position of the transmission.

* * * * *